United States Patent
Li et al.

(10) Patent No.: US 11,791,078 B1
(45) Date of Patent: Oct. 17, 2023

(54) METHOD FOR SYNCHRONOUS PRODUCTION OF MANGANESE TETRAOXIDE AND FERRIC OXIDE FOR SOFT MAGNETIC MATERIAL BY USING MARINE POLYMETALLIC NODULES

(71) Applicants: CHONGQING SHANGJIA ELECTRONIC CO., LTD., Chongqing (CN); CHONGQING UNIVERSITY, Chongqing (CN)

(72) Inventors: Shuchun Li, Chongqing (CN); Liang Fu, Chongqing (CN); Fusheng Pan, Chongqing (CN); Xinren Liao, Chongqing (CN); Hualin Xie, Chongqing (CN); Juncai Ma, Chongqing (CN); Ping Li, Chongqing (CN); Zhan Xu, Chongqing (CN); Weipeng Zhang, Chongqing (CN)

(73) Assignees: CHONGQING SHANGJIA ELECTRONIC CO., LTD., Chongqing (CN); CHONGQING UNIVERSITY, Chongqing (CN)

( * ) Notice: Subject to any disclaimer, the term of this patent is extended or adjusted under 35 U.S.C. 154(b) by 0 days.

(21) Appl. No.: 18/316,188

(22) Filed: May 11, 2023

(30) Foreign Application Priority Data

Jul. 13, 2022 (CN) .......................... 202210825781.2

(51) Int. Cl.
*H01F 1/00* (2006.01)
*C01G 45/02* (2006.01)
*C01G 49/06* (2006.01)
*H01F 1/34* (2006.01)

(52) U.S. Cl.
CPC ............. *H01F 1/344* (2013.01); *C01G 45/02* (2013.01); *C01G 49/06* (2013.01)

(58) Field of Classification Search
CPC .......... H01F 1/344; C01G 45/02; C01G 49/06

USPC ............................................................ 423/1
See application file for complete search history.

(56) References Cited

U.S. PATENT DOCUMENTS 4,123,499 A  10/1978  Welsh et al.

FOREIGN PATENT DOCUMENTS

| | | |
|---|---|---|
| CN | 103011297 A | 4/2013 |
| CN | 103757200 A | 4/2014 |
| CN | 108910957 A | 11/2018 |
| CN | 110157904 A | 8/2019 |
| CN | 110395767 A | 11/2019 |
| CN | 111647742 A | 9/2020 |
| CN | 111876586 A | 11/2020 |
| DE | 2510243 A1 | 9/1975 |
| GB | 353867 A | 7/1931 |
| RU | 2307177 C1 | 9/2007 |

OTHER PUBLICATIONS

Hou Huifen: "Comprehensive Utilization of Marine Manganese Nodules", Shanghai Nonferrous Metals, p. 45-49.

*Primary Examiner* — Steven J Bos

(57) ABSTRACT

A method for synchronous production of manganese tetraoxide and ferric oxide for a soft magnetic material by using marine polymetallic nodules includes: 1) crushing and grinding marine manganese nodules and baking to a constant weight; thoroughly mixing with a mixed flux and roasting in a muffle furnace; 2) carrying out solid-liquid separation, washing solid-phase precipitates with water, grinding the solid, adding sulfuric acid, controlling the temperature to be below 50° C., and vacuuming a reactor up; 3) adding a reducing agent to react at room temperature for 5-10 min, adding ammonia water to adjust the pH value to 5.5, and carrying out separation and filtering; 4) controlling the temperatures of manganese sulfate and ferric sulfate solutions to be below 50° C., and adding ammonium sulfide; and 5) washing with deionized water, and calcining at 800-900° C. for 1-3 s by a suspension low-temperature instantaneous firing system.

5 Claims, No Drawings

METHOD FOR SYNCHRONOUS PRODUCTION OF MANGANESE TETRAOXIDE AND FERRIC OXIDE FOR SOFT MAGNETIC MATERIAL BY USING MARINE POLYMETALLIC NODULES

BACKGROUND OF THE INVENTION

1. Technical Field

The present invention belongs to the field of marine resource utilization, and in particular relates to a method for synchronous production of manganese tetraoxide and ferric oxide for a soft magnetic material by using marine polymetallic nodules.

2. Description of Related Art

Manganese nodules contain manganese (27-30%), and also contain a small amount of Ni, Cu, Co, Fe, Si, Al, and very small amounts of Ca, Mg, Ti, Sn, Pb, Sb and other metal elements.

Marine manganese nodules exist in the form of mixtures of insoluble aluminosilicates and permanganates, in which Mn element mainly exists in the form of high-valent oxides, with a stable crystal structure and insoluble in acid-base solutions. Usually, the mineral structure of nodules needs to be destroyed. The main treatment methods are fire reduction, wet reduction and biological leaching. In these methods, wet reduction of manganese dioxide is an important way for manganese ore smelting, with the highest leaching rate of Mn but high consumption of acid and alkali and large pressure on environmental protection. The biological leaching method has long process cycle and is not suitable for large-scale production. The fire reduction of Mn requires high energy consumption and can produce a large amount of Mn-rich slag which requires complicated and long-process flow subsequent treatment process. In order to better reduce high-valent Mn to low-valent Mn from insoluble aluminosilicate and permanganate, the marine manganese nodules is required to be very fine in particle size. As disclosed in CN1037785C is a method for extracting manganese by reducing marine manganese nodules with aromatic amines. In this method, the leaching rate can reach 90% or above, the kinetic characteristics of the leaching reaction are good, and the leaching speed is high. However, since the insoluble structure of marine manganese nodules is not destroyed, it is required that the particle size of marine manganese nodules is less than 0.5 mm and the actual particle size is less than 0.074 mm, the material mixing process takes a long time, and the extraction efficiency of Mn is not stable (87.16-98.41%).

BRIEF SUMMARY OF THE INVENTION

Directed to the technical problem in the prior art, the present invention is intended to provide a method for synchronous production of manganese tetraoxide and ferric oxide for a soft magnetic material by using marine polymetallic nodules.

To achieve the above object, the present invention is implemented through the following technical solution: a method for synchronous production of manganese tetraoxide and ferric oxide for a soft magnetic material by using marine polymetallic nodules, comprising the following steps:

1) crushing and grinding marine manganese nodules to less than 5 mm in particle size, baking the crushed marine manganese nodules to a constant weight, thoroughly mixing the pretreated marine manganese nodules and a mixed flux, and roasting the mixture in a muffle furnace at 800° C. for 30-60 min to realize solid-liquid layering, wherein the mixed flux is a two-component molten salt system comprising, by mass, 40% of a flux $KBF_4$ and 60% of an extractant $NaAlF_4$;
2) carrying out solid-liquid separation, washing the obtained solid-phase precipitates with water, then grinding the solid to below 5 mm in particle size, putting the ground solid into a reactor with a cooling device, adding a sulfuric acid solution to have a reaction, controlling the temperature to be below 50° C., and evacuation the reactor;
3) adding a reducing agent to react at room temperature for 5-10 min, adding ammonia water to adjust the pH value to 5.5, and carrying out separation and filtering to remove Ca, Mg, Pb and other impurities to obtain a manganese sulfate solution and a ferric sulfate solution;
4) controlling the temperatures of the manganese sulfate solution and the ferric sulfate solution to be below 50° C., adding ammonium sulfide in a mass ratio of 1-2%0, and filtering the solution to further remove heavy metals such as Sn, Ni, Ti and the like out of the manganese sulfate solution; adding ammonium bicarbonate to the purified manganese sulfate and ferric sulfate solution, and filtering the reaction solution to obtain ferric and manganese carbonate precipitates and an ammonium sulfate solution; and
5) evaporating the ammonium sulfate solution to recover ammonium sulfate as an agricultural fertilizer, washing the manganese and ferric carbonates with deionized water, and then calcining the manganese and ferric carbonates at 800-900° C. for 1-3 s by using a suspension low-temperature instantaneous firing system so that the manganese and ferric carbonates are decomposed into manganese tetraoxide and ferric oxide, crushing or sand-milling the solid manganese tetraoxide and ferric oxide, washing the manganese tetraoxide and ferric oxide with deionized water, and drying the mixture to obtain a ferromanganese composite material used for a soft magnetic material.

In the above solution, the mass ratio of the pretreated marine manganese nodules to the mixed flux is 1:5

In the above solution, the amount of the sulfuric acid solution added is based on the content of manganese dioxide, the amount of sulfuric acid added is 1.5-2 times a theoretical addition of sulfuric acid, and the concentration of the sulfuric acid solution is 400 g/L.

In the above solution, the reducing agent is 1,3,5-triaminobenzene or aminophenol.

In the above solution: the aminophenol is any one of o-aminophenol, m-aminophenol and p-aminophenol.

In the above solution, the amount of the reducing agent added is based on the content of manganese dioxide, and the amount of the reducing agent added is 1.5-2 times a theoretical addition of the reducing agent.

The amount of ammonium bicarbonate added to the purified manganese sulfate solution and ferric sulfate solution is based on the content of manganese dioxide, and the amount of ammonium bicarbonate added is 1-2 times the theoretical addition of ammonium bicarbonate.

The mineral structure of marine polymetallic nodules is very stable and it is extremely difficult to destroy these structures under acidic conditions, thereby affecting the leaching of Mn and Fe. The flux $KBF_4$ in the mixed flux begins to melt at 530° C., and as the temperature rises to 800° C., $KBF_4$ is decomposed into KF and $BF_3$. Gaseous $BF_3$ volatilizes, and KF dissociates in molten salt to produce $K^+$ with strong permeability and corrosiveness and $F^+$ with strong fluidity and corrosiveness. $K^+$ and $F^-$ synergistically destroy the mineral structure of marine polymetallic nodules, thereby releasing metal ions of valence. $NaAlF_4$ can selectively extract aluminum, silicon and other impurities into the liquid phase molten salt in a molten state, while the Mn, Fe, Pb, Ca, Mg, Ni, Ti, Sn and other metals in the marine polymetallic nodules exist in a lower layer of molten salt in the form of solid precipitates.

After the solid-liquid separation of the molten salt, under a vacuum condition, the high-valent metals in the solid-phase precipitates are reduced to low-valent metals by using aminophenol. Compared with reducing agents such as diamines and diphenols used in the prior art, triaminobenzene or aminophenol has a stronger reducing ability, which is manifested as a shortened recovery time. Therefore, the conversion efficiency of manganese dioxide to divalent manganese is improved, and the conversion efficiency of other metals from high valence to low valence is also improved.

Similarly, the high-valent metals in the solid-phase precipitates obtained after the solid-liquid separation are reduced to low-valent metals by using 1,3,5-triaminobenzene or aminophenol. Compared with reducing agents such as diamines and diphenols used in the prior art, 1,3,5-triaminobenzene and aminophenol have a stronger reducing ability, which is manifested as a shortened recovery time. Therefore, the conversion efficiency of manganese dioxide to divalent manganese is improved, and the conversion efficiency of other metals from high valence to low valence is also improved.

Sulfuric acid is added to convert ferromanganese into sulfates, and Ca, Mg, and Pb exist in the form of sulfate precipitates. Although other metal impurities exist in the solution in the form of sulfates, the pH value of the solution is adjusted to 5.5 by using ammonia water, impurity elements such as Sn, Sb, Cu and Co exist in the form of hydroxide precipitates, and impurities such as Ca, Mg, Pb, Sn, Sb, Ti, Cu and Co are then filtered out. Ferromanganese exists in the filtrate in the form of sulfates. Ammonium sulfide is added to precipitate heavy metals to further remove heavy metal impurities out of manganese sulfate. In order to prevent the precipitation of Fe in the form of sulfides and hydroxides, the pH of the solution is strictly controlled to be 5.5. Through the above solution, extremely pure manganese sulfate and ferric sulfate solutions are obtained simultaneously.

The purified manganese sulfate and ferric sulfate solutions are used to prepare manganese tetraoxide and ferric oxide for a soft magnetic material by using the applicant's previous technologies (see ZL 201110100752.1 and ZL 200910103167.X).

Beneficial Effect (1) By adopting the technical solution, Mn and Fe extracted and leached from marine polymetallic nodules has good stability, and the leaching rates of Mn and Fe are both higher than 98.5%.

(2) The technical solution achieves the synchronous extraction of Mn and Fe from marine polymetallic nodules and has the advantages of shorter reduction time and higher reduction efficiency as compared with the prior art.

(3) Compared with the prior art, the technical solution of the present invention can remove impurities more thoroughly and produce manganese tetraoxide and ferric oxide which both have a purity of higher than 99.5% and can be used as raw materials for preparing a high-grade soft magnetic ferrite.

DETAILED DESCRIPTION OF THE INVENTION

The present invention will be further described below in conjunction with embodiments.

Example 1

Provided was a method for synchronous production of manganese tetraoxide and ferric oxide for a soft magnetic material by using marine polymetallic nodules, including the following steps.

1) Marine manganese nodules were crushed and ground to less than 5 mm in particle size and then baked to a constant weight in an oven at 110° C. The pretreated marine manganese nodules and a mixed flux were thoroughly mixed in a mass ratio of 1:5 and then roasted in a muffle furnace at 800° C. for 30 min to realize solid-liquid layering, wherein the mixed flux was a two-component molten salt system including, by mass, 40% of a flux $KBF_4$ and 60% of an extractant $NaAlF_4$.

2) Solid-liquid separation was carried out, and the obtained solid-phase precipitates were washed with water and then ground to below 5 mm in particle size and put into a reactor with a cooling device. A 400 g/L sulfuric acid solution was then added to have a reaction. The amount of the sulfuric acid solution added was based on the content of manganese dioxide. The amount of sulfuric acid added was 1.5 times a theoretical addition of sulfuric acid. The temperature was controlled to be below 50° C., and the reactor was evacuated.

3) A reducing agent 1,3,5-triaminobenzene was then added. The amount of the reducing agent 1,3,5-triaminobenzene added was based on the content of manganese dioxide. The amount of the reducing agent added was 1.5 times a theoretical addition of the reducing agent. After reaction at room temperature for 5-10 min, ammonia water was added to adjust the pH value to 5.5. Separation and filtering were then carried out to remove Ca, Mg, Pb and other impurities to obtain a manganese sulfate solution and a ferric sulfate solution, with an impurity content less than 0.5%.

4) The temperatures of the manganese sulfate solution and the ferric sulfate solution were controlled to be below 50° C. Ammonium sulfide was then added in a mass ratio of 2‰. The solution was then filtered to further remove heavy metals such as Sn, Ni, Ti and the like out of the manganese sulfate solution. Ammonium bicarbonate was added to the purified manganese sulfate and ferric sulfate solution. The amount of ammonium bicarbonate added was based on the content of manganese dioxide. The amount of ammonium bicarbonate added was twice a theoretical addition of ammonium bicarbonate. The reaction solution was then filtered to obtain ferric and manganese carbonate precipitates and an ammonium sulfate solution.

5) The ammonium sulfate solution was evaporated to recover ammonium sulfate as an agricultural fertilizer. The manganese and ferric carbonates were washed with deionized water, and then calcined at 800-900° C. for 1-3 second(s) by using a suspension low-temperature instantaneous firing system (as disclosed in ZL 201110100752.1) so that the manganese and ferric carbonates were decomposed into manganese tetraoxide and ferric oxide. The solid manganese tetraoxide and ferric oxide were crushed or sand-milled, washed with deionized water, and then dried to obtain a manganese tetraoxide-ferric oxide composite material used for a soft magnetic material. The impurity content was less than 0.5%. The leaching rates of Mn and Fe were 98.5%.

Example 2

Provided was a method for synchronous production of manganese tetraoxide and ferric oxide for a soft magnetic material by using marine polymetallic nodules, including the following steps.

1) Marine manganese nodules were crushed and ground to less than 5 mm in particle size and then baked to a constant weight in an oven at 110° C. The pretreated marine manganese nodules and a mixed flux were thoroughly mixed in a mass ratio of 1:5 and then roasted in a muffle furnace at 800° C. for 60 min to realize solid-liquid layering, wherein the mixed flux was a two-component molten salt system including, by mass, 40% of a flux $KBF_4$ and 60% of an extractant $NaAlF_4$.

2) Solid-liquid separation was carried out, and the obtained solid-phase precipitates were washed with water and then ground to below 5 mm in particle size and put into a reactor with a cooling device. A 400 g/L sulfuric acid solution was then added to have a reaction. The amount of the sulfuric acid solution added was based on the content of manganese dioxide. The amount of sulfuric acid added was 2 times a theoretical addition of sulfuric acid. The temperature was controlled to be below 50° C., and the reactor was evacuated.

3) A reducing agent o-aminophenol was then added. The amount of the reducing agent added was based on the content of manganese dioxide. The amount of the reducing agent added was 1.5 times a theoretical addition of the reducing agent. After reaction at room temperature for 5-10 min, ammonia water was added to adjust the pH value to 5.5. Separation and filtering were then carried out to remove Ca, Mg, Pb and other impurities to obtain a manganese sulfate solution and a ferric sulfate solution, with an impurity content less than 0.5%.

4) The temperatures of the manganese sulfate solution and the ferric sulfate solution were controlled to be below 50° C. Ammonium sulfide was then added in a mass ratio of 1‰. The solution was then filtered to further remove heavy metals such as Sn, Ni, Ti and the like out of the manganese sulfate solution. Ammonium bicarbonate was added to the purified manganese sulfate and ferric sulfate solution. The amount of ammonium bicarbonate added was based on the content of manganese dioxide. The amount of ammonium bicarbonate added was 1.2 times a theoretical addition of ammonium bicarbonate. The reaction solution was then filtered to obtain ferric and manganese carbonate precipitates and an ammonium sulfate solution.

5) The ammonium sulfate solution was evaporated to recover ammonium sulfate as an agricultural fertilizer. The manganese and ferric carbonates were washed with deionized water, and then calcined at 800-900° C. for 1-3 s by using a suspension low-temperature instantaneous firing system (as disclosed in ZL 201110100752.1) so that the manganese and ferric carbonates were decomposed into manganese tetraoxide and ferric oxide. The solid manganese tetraoxide and ferric oxide were crushed or sand-milled, washed with deionized water, and then dried to obtain a manganese tetraoxide-ferric oxide composite material used for a soft magnetic material. The impurity content was less than 0.5%. The leaching rates of Mn and Fe were 99.2%.

Example 3

Provided was a method for synchronous production of manganese tetraoxide and ferric oxide for a soft magnetic material by using marine polymetallic nodules, including the following steps.

1) Marine manganese nodules were crushed and ground to less than 5 mm in particle size and then baked to a constant weight in an oven at 110° C. The pretreated marine manganese nodules and a mixed flux were thoroughly mixed in a mass ratio of 1:5 and then roasted in a muffle furnace at 800° C. for 40 min to realize solid-liquid layering, wherein the mixed flux was a two-component molten salt system including, by mass, 40% of a flux $KBF_4$ and 60% of an extractant $NaAlF_4$.

2) Solid-liquid separation was carried out, and the obtained solid-phase precipitates were washed with water and then ground to below 5 mm in particle size and put into a reactor with a cooling device. A 400 g/L sulfuric acid solution was then added to have a reaction. The amount of the sulfuric acid solution added was based on the content of manganese dioxide. The amount of sulfuric acid added was twice a theoretical addition of sulfuric acid. The temperature was controlled to be below 50° C., and the reactor was evacuated.

3) A reducing agent m-aminophenol was then added. The amount of the reducing agent added was based on the content of manganese dioxide. The amount of the reducing agent added was 1.5 times a theoretical addition of the reducing agent. After reaction at room temperature for 5-10 min, ammonia water was added to adjust the pH value to 5.5. Separation and filtering were then carried out to remove Ca, Mg, Pb and other impurities to obtain a manganese sulfate solution and a ferric sulfate solution, with an impurity content less than 0.5%.

4) The temperatures of the manganese sulfate solution and the ferric sulfate solution were controlled to be below 50° C. Ammonium sulfide was then added in a mass ratio of 1‰. The solution was then filtered to further remove heavy metals such as Sn, Ni, Ti and the like out of the manganese sulfate solution. Ammonium bicarbonate was added to the purified manganese sulfate and ferric sulfate solution. The amount of ammonium bicarbonate added was based on the content of manganese dioxide. The amount of ammonium bicarbonate added was 1.5 times a theoretical addition of ammonium bicarbonate. The reaction solution was then filtered to obtain ferric and manganese carbonate precipitates and an ammonium sulfate solution.

5) The ammonium sulfate solution was evaporated to recover ammonium sulfate as an agricultural fertilizer. The manganese and ferric carbonates were washed with deionized water, and then calcined at 800-900° C. for 1-3 s by using a suspension low-temperature instantaneous firing system (as disclosed in ZL 201110100752.1) so that the manganese and ferric carbonates were decomposed into manganese tetraoxide and ferric oxide. The solid manganese tetraoxide and ferric oxide were crushed or sand-milled, washed with deionized water, and then dried to obtain a manganese tetraoxide-ferric oxide composite material used for a soft magnetic material. The impurity content was less than 0.5%. The leaching rates of Mn and Fe were 98.9%.

Example 4

Provided was a method for synchronous production of manganese tetraoxide and ferric oxide for a soft magnetic material by using marine polymetallic nodules, including the following steps.

1) Marine manganese nodules were crushed and ground to less than 5 mm in particle size and then baked to a constant weight in an oven at 110° C. The pretreated marine manganese nodules and a mixed flux were thoroughly mixed in a mass ratio of 1:5 and then roasted in a muffle furnace at 800° C. for 40 min to realize solid-liquid layering, wherein the mixed flux was a two-component molten salt system including, by mass, 40% of a flux $KBF_4$ and 60% of an extractant $NaAlF_4$.

2) Solid-liquid separation was carried out, and the obtained solid-phase precipitates were washed with water and then ground to below 5 mm in particle size and put into a reactor with a cooling device. A 400 g/L sulfuric acid solution was then added to have a reaction. The amount of the sulfuric acid solution added was based on the content of manganese dioxide. The amount of sulfuric acid added was 1.5 times a theoretical addition of sulfuric acid. The temperature was controlled to be below 50° C., and the reactor was evacuated.

3) A reducing agent p-aminophenol was then added. The amount of the reducing agent added was based on the content of manganese dioxide. The amount of the reducing agent added was 1.5 times a theoretical addition of the reducing agent. After reaction at room temperature for 5-10 min, ammonia water was added to adjust the pH value to 5.5. Separation and filtering were then carried out to remove Ca, Mg, Pb and other impurities to obtain a manganese sulfate solution and a ferric sulfate solution, with an impurity content less than 0.5%.

4) The temperatures of the manganese sulfate solution and the ferric sulfate solution were controlled to be below 50° C. Ammonium sulfide was then added in a mass ratio of 2%0. The solution was then filtered to further remove heavy metals such as Sn, Ni, Ti and the like out of the manganese sulfate solution. Ammonium bicarbonate was added to the purified manganese sulfate and ferric sulfate solution. The amount of ammonium bicarbonate added was based on the content of manganese dioxide. The amount of ammonium bicarbonate added was 1.4 times a theoretical addition of ammonium bicarbonate. The reaction solution was then filtered to obtain ferric and manganese carbonate precipitates and an ammonium sulfate solution.

5) The ammonium sulfate solution was evaporated to recover ammonium sulfate as an agricultural fertilizer. The manganese and ferric carbonates were washed with deionized water, and then calcined at 800-900° C. for 1-3 s by using a suspension low-temperature instantaneous firing system (as disclosed in ZL 201110100752.1) so that the manganese and ferric carbonates were decomposed into manganese tetraoxide and ferric oxide. The solid manganese tetraoxide and ferric oxide were crushed or sand-milled, washed with deionized water, and then dried to obtain a manganese tetraoxide-ferric oxide composite material used for a soft magnetic material. The impurity content was less than 0.5%. The leaching rates of Mn and Fe were 99%.

While the embodiments of the present invention have been shown and described, it will be understood by those skilled in the art that the various modifications, changes, substitutions and variations of the embodiments may be made without departing from the spirit and scope of the invention. The scope of the invention is defined by the appended claims and their equivalents.

What is claimed is:

1. A method for synchronous production of manganese tetraoxide and ferric oxide for a soft magnetic material by using marine polymetallic nodules, comprising the following steps:
   1) crushing and grinding marine manganese nodules to less than 5 mm in particle size, baking the crushed and ground marine manganese nodules to a constant weight, thoroughly mixing the baked marine manganese nodules with a mixed flux, and roasting the mixture in a muffle furnace at 800° C. for 30-60 min to a solid-liquid layering, wherein the mixed flux is a two-component molten salt system comprising, by mass, 40% of a flux $KBF_4$ and 60% of an extractant $NaAlF_4$;
   2) carrying out solid-liquid separation, washing the obtained solid-phase precipitates with water, then grinding the solid to below 5 mm in particle size, putting the ground solid into a reactor with a cooling device, adding sulfuric acid to the reactor, controlling the temperature below 50° C., and evacuating the reactor;
   3) adding a reducing agent to the reactor at room temperature for 5-10 min, adding ammonia water to the reactor to adjust the pH value to 5.5, and carrying out separation and filtering to remove impurities to obtain a manganese sulfate and a ferric sulfate reaction solution;
   4) controlling the temperatures of the reaction solution to be below 50° C., adding ammonium sulfide in a mass ratio of 1-2% to the reaction solution, and filtering the reaction solution to remove heavy metals and form a purified reaction solution; adding ammonium bicarbonate to the purified reaction solution, and filtering the purified reaction solution to obtain ferric and manganese carbonate precipitates and an ammonium sulfate solution; and
   5) evaporating the ammonium sulfate solution to recover ammonium sulfate, washing the ferric and manganese carbonate precipitates with deionized water, and then calcining the washed ferric and manganese carbonate precipitates to form manganese and ferric carbonates at 800-900° C. for 1-3 second(s) with by using a suspension low-temperature instantaneous firing system so that the manganese and ferric carbonates are decomposed into solid manganese tetraoxide and ferric oxide, crushing or sand-milling the solid manganese tetraoxide and ferric oxide, washing the crushed or sand-milled manganese tetraoxide and ferric oxide with deionized water, and drying the washed manganese tetraoxide and ferric oxide to obtain a manganese tetraoxide-ferric oxide composite material, wherein the reducing agent is 1,3,5-triaminobenzene or aminophenol.

2. The method for synchronous production of manganese tetraoxide and ferric oxide for a soft magnetic material by using marine polymetallic nodules according to claim 1, wherein the mass ratio of the pretreated marine manganese nodules to the mixed flux is 1:5.

3. The method for synchronous production of manganese tetraoxide and ferric oxide for a soft magnetic material by using marine polymetallic nodules according to claim 2, wherein the amount of the sulfuric acid solution added is based on the content of manganese dioxide, the amount of sulfuric acid added is 1.5-2 times a theoretical addition of sulfuric acid, and the concentration of the sulfuric acid solution is 400 g/L.

4. The method for synchronous production of manganese tetraoxide and ferric oxide for a soft magnetic material by using marine polymetallic nodules according to claim 3, wherein the aminophenol is any one of o-aminophenol, m-aminophenol and p-aminophenol.

5. The method for synchronous production of manganese tetraoxide and ferric oxide for a soft magnetic material by using marine polymetallic nodules according to claim 4, wherein the amount of the reducing agent added is based on the content of manganese dioxide, and the amount of the reducing agent added is 1.5-2 times a theoretical addition of the reducing agent.

* * * * *